United States Patent
Ohyama et al.

(10) Patent No.: US 10,634,390 B2
(45) Date of Patent: Apr. 28, 2020

(54) ELECTRIC COMPRESSOR

(71) Applicant: DENSO CORPORATION, Kariya, Aichi-pref. (JP)

(72) Inventors: Teruaki Ohyama, Kariya (JP); Koji Sakai, Kariya (JP); Yuuji Kamiya, Kariya (JP); Tomoyuki Sumi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 91 days.

(21) Appl. No.: 15/762,771

(22) PCT Filed: Sep. 5, 2016

(86) PCT No.: PCT/JP2016/075985
§ 371 (c)(1),
(2) Date: Mar. 23, 2018

(87) PCT Pub. No.: WO2017/056863
PCT Pub. Date: Apr. 6, 2017

(65) Prior Publication Data
US 2019/0078812 A1 Mar. 14, 2019

(30) Foreign Application Priority Data
Sep. 29, 2015 (JP) .................. 2015-190688

(51) Int. Cl.
*F25B 1/10* (2006.01)
*H02P 3/22* (2006.01)
*H02P 3/02* (2006.01)
*F25B 49/00* (2006.01)
(Continued)

(52) U.S. Cl.
CPC .......... *F25B 1/10* (2013.01); *B60H 1/00921* (2013.01); *F04C 28/06* (2013.01);
(Continued)

(58) Field of Classification Search
CPC .......... G01P 3/48; G01D 18/00; G01D 3/028; G01D 3/08
See application file for complete search history.

(56) References Cited

U.S. PATENT DOCUMENTS 5,779,450 A   7/1998  Fujiwara et al.
5,820,349 A * 10/1998  Caillat ................. F04C 28/28
                                              417/44.11
(Continued)

FOREIGN PATENT DOCUMENTS

CN        1131266 A    9/1996
JP      S52025539 B1   7/1977
(Continued)

*Primary Examiner* — Jorge L Carrasquillo
*Assistant Examiner* — Zoheb S Imtiaz
(74) *Attorney, Agent, or Firm* — Harness, Dickey & Pierce, P.L.C.

(57) ABSTRACT

An electric compressor includes a compression portion discharging a high pressure refrigerant by compressing a low-pressure drawn refrigerant, an electric motor driving the compression portion with a rotation of a rotor, a motor drive circuit driving the electric motor, an intermediate pressure port through which an intermediate pressure refrigerant is introduced into the compression portion, and a controller performing a rotation control of the rotor. When the controller stops the electric motor in a two-step compression mode in which the intermediate pressure refrigerant is introduced into the compression portion, the controller stops the rotor rotating by performing short-circuit braking on the electric motor and then fixes a rotational position of the rotor at a predetermined rotational position by performing direct current excitation on the electric motor.

10 Claims, 10 Drawing Sheets

COOLING OPERATION MODE

(51) Int. Cl.
*F25B 49/02* (2006.01)
*F04C 28/06* (2006.01)
*F04C 29/00* (2006.01)
*B60H 1/00* (2006.01)
*F25B 1/04* (2006.01)
*F25B 5/04* (2006.01)
*F25B 6/04* (2006.01)
*F04C 18/02* (2006.01)
*F04C 18/344* (2006.01)

(52) U.S. Cl.
CPC ........ *F04C 29/0085* (2013.01); *F25B 49/005* (2013.01); *F25B 49/025* (2013.01); *H02P 3/025* (2013.01); *H02P 3/22* (2013.01); *F04C 18/0215* (2013.01); *F04C 18/344* (2013.01); *F04C 2270/72* (2013.01); *F25B 1/04* (2013.01); *F25B 5/04* (2013.01); *F25B 6/04* (2013.01); *F25B 2341/0662* (2013.01); *F25B 2400/0409* (2013.01); *F25B 2400/0411* (2013.01); *F25B 2400/13* (2013.01); *F25B 2400/23* (2013.01); *F25B 2600/01* (2013.01); *F25B 2600/021* (2013.01); *F25B 2700/1931* (2013.01); *F25B 2700/1933* (2013.01); *F25B 2700/2104* (2013.01); *F25B 2700/2106* (2013.01); *F25B 2700/2117* (2013.01); *Y02B 30/741* (2013.01)

(56) References Cited

U.S. PATENT DOCUMENTS

| | | | |
|---|---|---|---|
| 2005/0011213 A1* | 1/2005 | Shindo | F04C 23/008 62/259.2 |
| 2009/0092501 A1* | 4/2009 | Seibel | F04B 35/04 417/44.1 |
| 2012/0266622 A1* | 10/2012 | Inaba | B60H 1/00899 62/186 |
| 2013/0025306 A1* | 1/2013 | Matsukura | F25B 41/04 62/115 |
| 2015/0096321 A1* | 4/2015 | Kawano | F25B 1/10 62/197 |
| 2015/0139818 A1 | 5/2015 | Nagata | |
| 2015/0143841 A1* | 5/2015 | Kawano | F25B 13/00 62/498 |
| 2015/0207447 A1* | 7/2015 | Sato | H02P 1/46 318/400.11 |
| 2016/0036361 A1* | 2/2016 | Sullivan | H02P 6/20 318/400.32 |

FOREIGN PATENT DOCUMENTS

| | | |
|---|---|---|
| JP | H10259788 A | 9/1998 |
| JP | 2010117072 A | 5/2010 |
| JP | 2015098804 A | 5/2015 |

* cited by examiner

ELECTRIC COMPRESSOR

CROSS REFERENCE TO RELATED APPLICATIONS

This application is a U.S. National Phase Application under 35 U.S.C. 371 of International Application No. PCT/JP2016/075985 filed on Sep. 5, 2016 and published in Japanese as WO 2017/056863 A1 on Apr. 6, 2017. This application is based on and claims the benefit of priority from Japanese Patent Application No. 2015-190688 filed on Sep. 29, 2015. The entire disclosures of all of the above applications are incorporated herein by reference.

TECHNICAL FIELD

The present disclosure relates to an electric compressor used in a gas injection cycle.

BACKGROUND ART

A vehicle air-conditioning device described in Patent Literature 1 compresses a refrigerant by driving a compressor on an engine drive force. On the contrary, an electric compressor driven by an electric motor is adopted in a vehicle air-conditioning device installed to an electrically-driven vehicle, such as an electric vehicle and a hybrid vehicle, which has been becoming popular in recent years. For example, a hybrid vehicle adopting an electric compressor is capable of operating the air-conditioning device even when an engine is at rest.

PRIOR ART LITERATURE

Patent Literature

Patent Literature 1: JP 2010-117072 A

SUMMARY

However, when an electric compressor driven by an electric motor is used in a vehicle air-conditioning device installed to an electrically-driven vehicle, such as an electric vehicle and a hybrid vehicle, problems as follows may possibly occur.

An electric compressor forming a gas injection cycle has a compression portion, an electric motor driving the compression portion, an intake port, a discharge port, and an intermediate pressure port. The electric compressor discharges a high pressure refrigerant from the discharge port by compressing a low pressure drawn refrigerant drawn in from the intake port in the compression portion. At a same time, an intermediate pressure refrigerant in the cycle is forced to flow in from the intermediate pressure port and combined with the refrigerant in a compression process. A refrigerant circuit where the intermediate pressure refrigerant flows is a refrigerant circuit of the gas injection cycle. The gas injection cycle is also called a two-step compression cycle. The gas injection cycle is used to enhance heating performance during a heating operation when a heat pump cycle is extremely cold. Hence, an operation mode in the gas injection cycle is executed during a heating operation at extremely low temperatures. Hereinafter, an operation mode in the gas injection cycle is referred to as a two-step compression mode.

Power is supplied to the electric compressor from a power supply installed to the vehicle. Hence, the electric compressor may be requested to suspend with an aim of securing power to be supplied from the vehicle power supply to any other vehicle-mount device, such as a main engine. However, when the electric compressor is suspended during a heating operation in the two-step compression mode, the refrigerant flows back into the intake port from the intermediate pressure port due to a pressure difference between the intermediate pressure refrigerant and the drawn refrigerant, in which case a rotor of the electric motor keeps rotating backward. Once the rotor rotates backward, estimation of a rotational position of the rotor becomes difficult when the electric motor is reactivated after a suspend request to the electric compressor is cancelled. Consequently, a step-out of the electric motor may possibly occur when reactivated.

Backward rotations of the rotor may be restricted by performing short-circuit braking on the electric motor by switching ON a switching element of one of an upper arm and a lower arm of a motor drive circuit and switching OFF a switching element of the other arm. By performing short-circuit braking on the electric motor, a duration of time over which the rotor is rotating backward can be shortened.

However, short-circuit braking occurs only when a current is flowing to the motor drive circuit and a closed circuit of a stator coil, that is, only when the rotor is rotating. Hence, when a pressure of the intermediate pressure refrigerant is higher than a pressure of the drawn refrigerant to some extent, the intermediate pressure refrigerant flows back into the intake port because of a pressure difference and the rotor which has once stopped rotating backward due to short-circuit braking rotates backward again. The rotor thus may repetitively rotate backward and stop until a difference between a pressure of the intermediate pressure refrigerant and a pressure of the drawn refrigerant becomes sufficiently small. Consequently, because the rotor does rotate backward, it becomes difficult to identify a rotational position of the rotor when the electric motor is reactivated. Hence, a step-out of the electric motor cannot be avoided.

An object of the present disclosure is to provide an electric compressor capable of restricting a step-out of an electric motor when reactivated.

According to an aspect of the present disclosure, an electric compressor includes: a compression portion configured to compress a low-pressure drawn refrigerant and discharge a high pressure refrigerant; an electric motor configured to drive the compression portion in accordance with rotation of a rotor; a motor drive circuit configured to drive the electric motor; an intermediate pressure port through which an intermediate pressure refrigerant is introduced into the compression portion; and a controller configured to control the rotation of the rotor. When the controller stops the electric motor during a two-step compression mode in which the intermediate pressure refrigerant is introduced into the compression portion, the controller stops the rotation of the rotor by performing short-circuit braking of the electric motor and then fixes a rotational position of the rotor at a predetermined rotational position by performing direct current excitation of the electric motor.

According to the configuration as above, when the electric motor is stopped in the two-step compression mode, the rotor is stopped rotating by the short-circuit braking and then a rotational position of the rotor is fixed to the predetermined rotational position by the direct current excitation. Hence, backward rotation of the rotor can be restricted even when a pressure of the intermediate pressure refrigerant is higher than a pressure of the drawn refrigerant to some extent, which can in turn restrict a step-out of the electric motor when reactivated.

DESCRIPTION OF EMBODIMENTS

Hereinafter, an embodiment of an electric compressor will be described. A general outline of a vehicle air-conditioning device using the electric compressor of the present embodiment will be described first.

Figure 1:
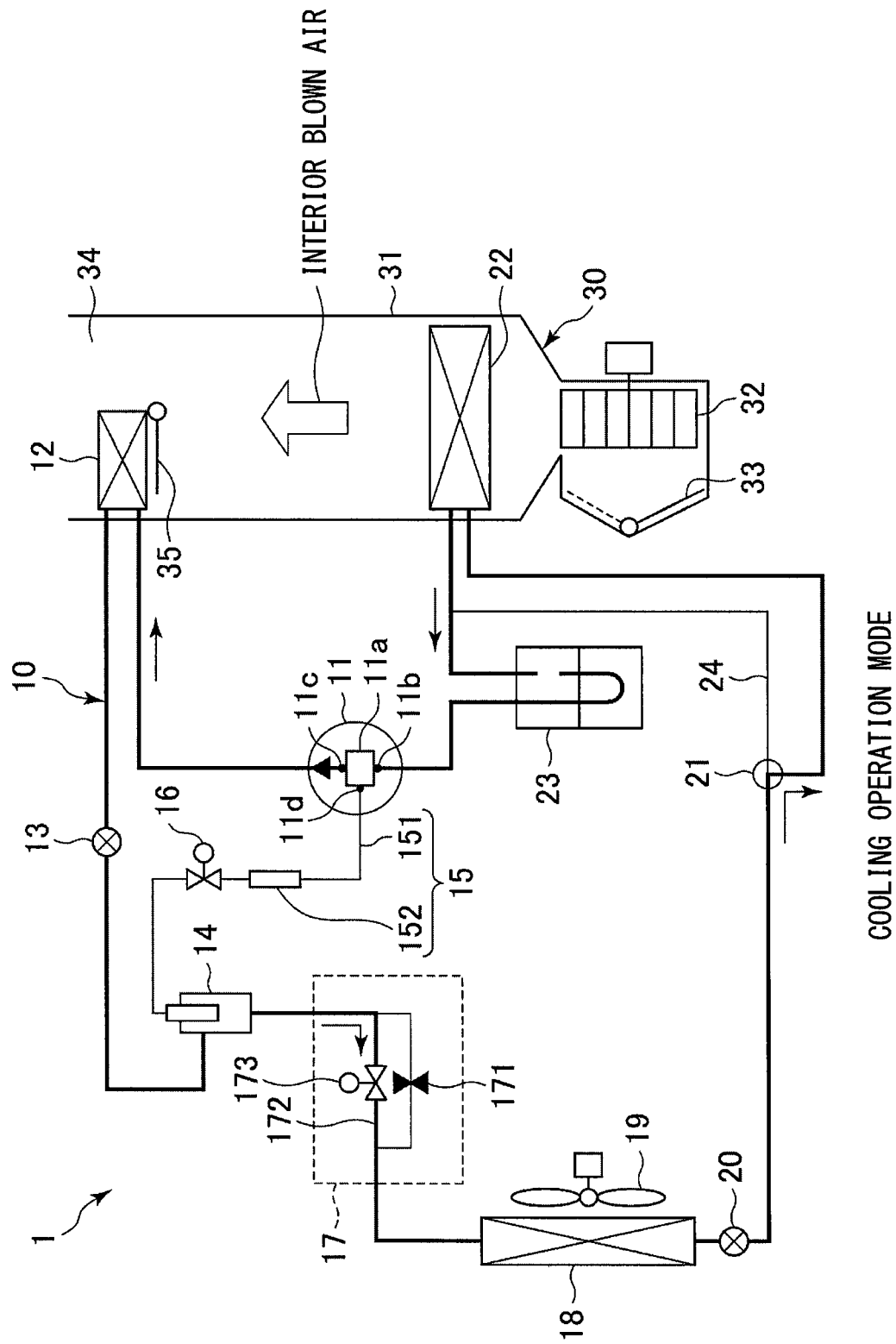
FIG. 1 is a block diagram showing an overall configuration of a vehicle air-conditioning device of an embodiment and a flow of a refrigerant in a cooling operation mode.
Figure 2:
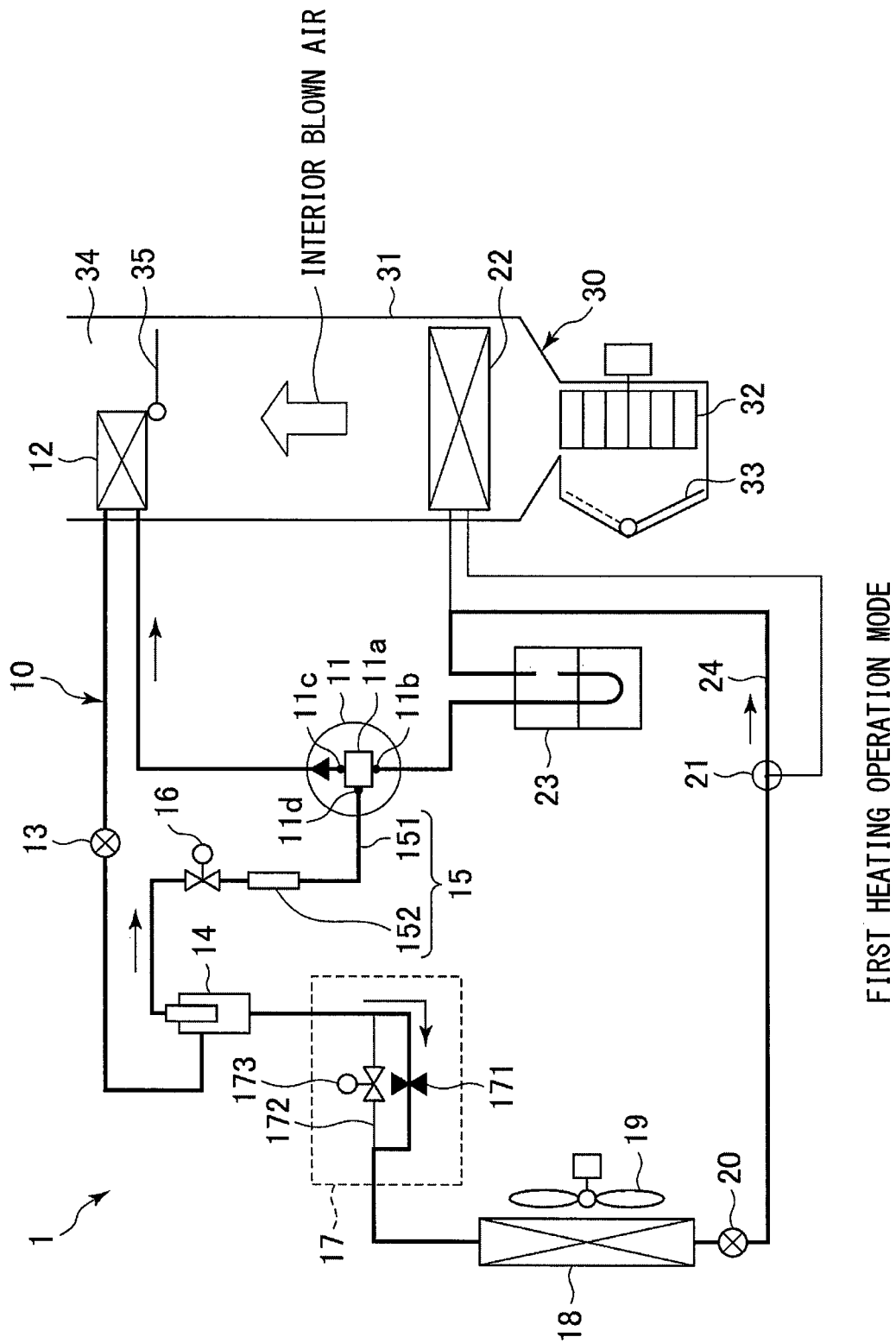
FIG. 2 is a block diagram showing the overall configuration of the vehicle air-conditioning device of the embodiment and a flow of the refrigerant in a first heating operation mode.
Figure 3:
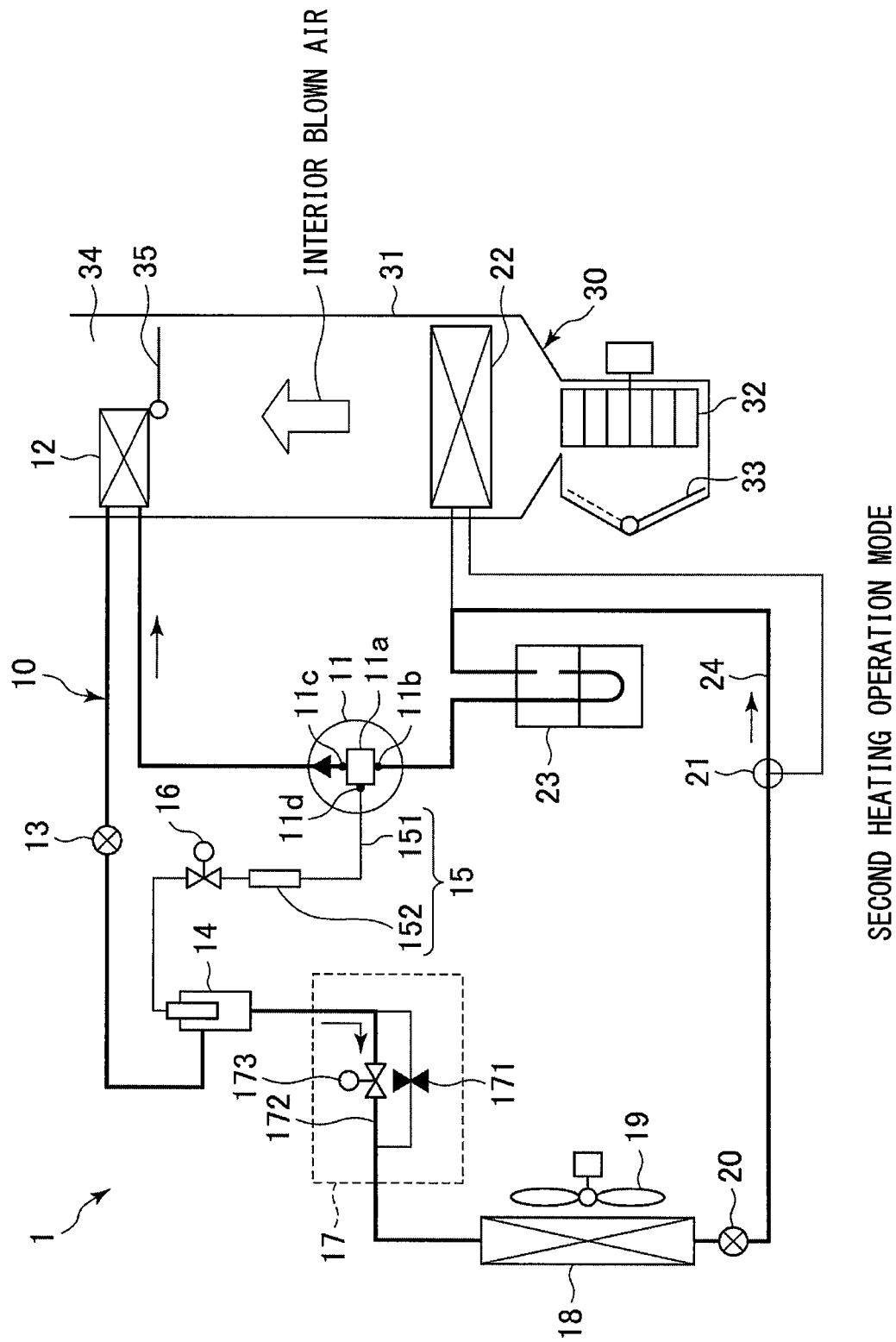
FIG. 3 is a block diagram showing the overall configuration of the vehicle air-conditioning device of the embodiment and a flow of the refrigerant in a second heating operation mode.

A vehicle air-conditioning device 1 of the present embodiment shown in FIG. 1 through FIG. 3 is applied to a hybrid vehicle which obtains a vehicle running drive force from an internal combustion engine (engine) and a running electric motor. The vehicle air-conditioning device 1 includes a heat pump cycle 10 and an internal air-conditioning unit 30.

The heat pump cycle 10 cools or heats interior blown air which is a subject to be air-conditioned by the vehicle air-conditioning device 1. The interior blown air is air blown into a compartment. In the heat pump cycle 10, any one of refrigerant circuits shown in FIG. 1 through FIG. 3 can be selected. The refrigerant circuit shown in FIG. 1 is used in a cooling operation mode in which the compartment is cooled by cooling the interior blown air. The refrigerant circuits shown in FIG. 2 and FIG. 3 are used, respectively, in a first heating operation mode and a second heating operation mode in both of which the compartment is heated by heating the interior blown air. The first heating operation mode is executed when an outside temperature is extremely low, for example, 0 [° C.] or below. The second heating operation mode is a normal heating operation mode.

The heat pump cycle 10 adopts a normal refrigerant based on chlorofluorocarbon as a refrigerant and forms a vapor-compression subcritical refrigeration cycle in which a pressure of a high pressure refrigerant does not exceed a critical pressure of the refrigerant. The heat pump cycle 10 of the present embodiment includes an electric compressor 11, an internal condenser 12, a first decompressor 13, a gas-liquid separator 14, an intermediate pressure refrigerant passage 15, an intermediate pressure on-off valve 16, a second decompressor 17, an external heat exchanger 18, a third decompressor 20, a three-way valve 21, an internal evaporator 22, an accumulator 23, and a second bypass passage 24.

The electric compressor 11 draws in the refrigerant, compresses the refrigerant, and discharges the compressed refrigerant in the heat pump cycle 10. The electric compressor 11 has a compression chamber 11a, an intake port 11b, a discharge port 11c, and an intermediate pressure port 11d. A low pressure refrigerant drawn in from the intake port 11b is compressed in the compression chamber 11a and discharged from the discharge port 11c as a high pressure refrigerant. An intermediate pressure refrigerant is led into the compression chamber 11a from the intermediate pressure port 11d and combined with the refrigerant in a compression process. The intermediate pressure refrigerant means a refrigerant at a pressure ranging from a pressure of the low pressure refrigerant drawn into the compression chamber 11a to a pressure of the high pressure refrigerant discharged from the compression chamber 11a.

Figure 4:
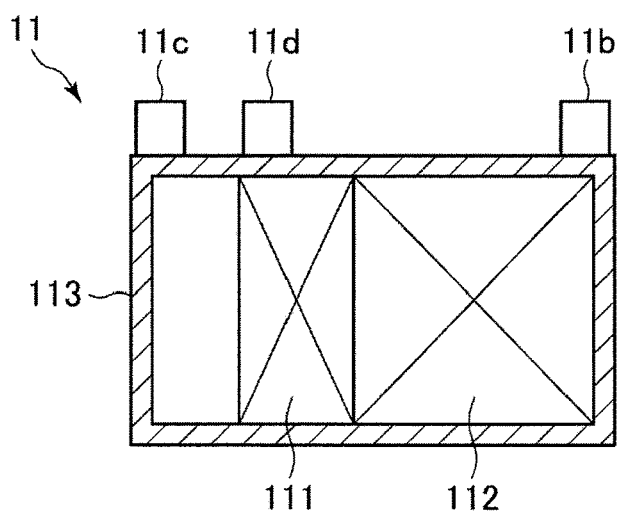
FIG. 4 is a sectional diagram showing a sectional structure of an electric compressor of the embodiment.

More specifically, as is shown in FIG. 4, the electric compressor 11 has a compression portion 111, an electric motor 112, and a housing 113. The compression portion 111 compresses the refrigerant in the compression chamber 11a of the electric compressor 11. The compression portion 111 is formed of a scroll compression mechanism. The compression portion 111 may be formed of another compression mechanism, such as a vane compression mechanism. The electric motor 112 rotationally drives the compression portion 111. The electric motor 112 is formed of a three-phase AC motor. The compression portion 111 and the electric motor 112 are stored in the housing 113.

The intake port 11b, the discharge port 11c, and the intermediate pressure port 11d are provided to the housing 113. The refrigerant flows inside the housing 113 by flowing from the intake port 11b to the discharge port 11c. The intermediate pressure port 11d communicates with the compression chamber 11a at a point where the refrigerant is in the compression process.

As has been described, the electric compressor 11 of the present embodiment generates a high pressure refrigerant by compressing a low pressure refrigerant drawn in from the intake port 11b in the compression portion 111 and discharges the high pressure refrigerant from the discharge port 11c. The electric compressor 11 also forces the intermediate pressure refrigerant to flow in from the intermediate pressure port 11d and combines the intermediate pressure refrigerant with the refrigerant in the compression process. Hereinafter, the low pressure refrigerant drawn in from the intake port 11b is referred to also as a drawn refrigerant. Also, the high pressure refrigerant discharged from the discharge port 11c is referred to also as a discharge refrigerant. Further, the refrigerant drawn in from the intermediate pressure port 11d is referred to also as an intermediate pressure refrigerant.

As are shown in FIG. 1 through FIG. 3, a refrigerant inlet side of the internal condenser 12 is connected to the discharge port 11c of the electric compressor 11. The internal condenser 12 is disposed in a casing 31 of the internal air-conditioning unit 30. The internal condenser 12 functions as a heat exchanger in which heat is exchanged between the high pressure refrigerant which has been discharged from the electric compressor 11 and the interior blown air which has passed through the internal evaporator 22 to let the high pressure refrigerant dissipate heat and to heat the interior blown air.

A refrigerant inlet side of the first decompressor 13 is connected to a refrigerant outlet side of the internal condenser 12. The first decompressor 13 decompresses the refrigerant flowing out from the internal condenser 12 in the first heating operation mode until the refrigerant turns into the intermediate pressure refrigerant. The first decompressor 13 also decompresses the refrigerant flowing out from the internal condenser 12 in the second heating operation mode until the refrigerant turns into the low pressure refrigerant. The first decompressor 13 is an electrical expansion valve. That is, the first decompressor 13 is an electrical variable throttle mechanism including a valve body with a variable throttle opening, and an electric actuator varying a throttle opening of the valve body.

A refrigerant inlet side of the gas-liquid separator 14 is connected to a refrigerant outlet side of the first decompressor 13. The gas-liquid separator 14 separates the refrigerant which has passed through the first decompressor 13 to a gas phase and a liquid phase. The gas-liquid separator 14 of the present embodiment adopts a centrifugal separation method by which a refrigerant is separated to a gas phase and a liquid phase under action of a centrifugal force. The intermediate pressure refrigerant passage 15 is connected to a gas-phase refrigerant outlet side of the gas-liquid separator 14. A refrigerant inlet side of the second decompressor 17 is connected to a liquid-phase refrigerant outlet side of the gas-liquid separator 14.

The intermediate pressure refrigerant passage 15 is a refrigerant passage leading a gas-phase refrigerant separated in the gas-liquid separator 14 to the intermediate pressure port 11d of the electric compressor 11. The intermediate pressure refrigerant passage 15 has a refrigerant pipe 151 and a muffler 152. The muffler 152 is formed of a passage forming member having a larger capacity than the refrigerant pipe 151 to reduce pulsations of the refrigerant in the intermediate pressure refrigerant passage 15.

The intermediate pressure on-off valve 16 is provided at a midpoint of the intermediate pressure refrigerant passage 15. The intermediate pressure on-off valve 16 opens and closes the intermediate pressure refrigerant passage 15. The intermediate pressure on-off valve 16 of the present embodiment is an electromagnetic valve controlled to open and close by a control signal. The intermediate pressure on-off valve 16 forms a refrigerant circuit of a two-step compression mode to introduce the intermediate pressure refrigerant to the intermediate pressure port 11d of the electric compressor 11 by opening in the first heating operation mode. The intermediate pressure on-off valve 16 inhibits the intermediate pressure refrigerant from flowing into the intermediate pressure refrigerant passage 15 by closing in the second heating operation mode.

The second decompressor 17 has a fixed throttle 171, a first bypass passage 172, and an on-off valve 173. The fixed throttle 171 decompresses the refrigerant. A nozzle, an orifice, or the like with a fixed throttle opening may be adopted as the fixed throttle 171. The first bypass passage 172 is a refrigerant passage leading the refrigerant flowing out from the gas-liquid separator 14 to the external heat exchanger 18 by bypassing the fixed throttle 171. The on-off valve 173 is an electromagnetic valve opening and closing the first bypass passage 172. By closing and opening the on-off valve 173, the second decompressor 17 can be changed between a throttle state in which a decompression action of the fixed throttle 171 is exerted and a full open state in which the decompression action of the fixed throttle 171 is not exerted. The second decompressor 17 is changed to the throttle state in the first heating operation mode and thereby decompresses the intermediate pressure liquid-phase refrigerant separated in the gas-liquid separator 14 until the intermediate pressure liquid-phase refrigerant turns into the low pressure refrigerant. The second decompressor 17 is changed to the full open state in the cooling operation mode and the second heating operation mode and thereby stays in a state in which the decompressing action is not exerted on the refrigerant.

A refrigerant inlet side of the external heat exchanger 18 is connected to a refrigerant outlet side of the second decompressor 17. The external heat exchanger 18 is disposed in an engine room of the vehicle, in other words, outside the compartment. The external heat exchanger 18 allows a refrigerant circulating inside and air outside the compartment blown by a blower fan 19 to exchange heat. The external heat exchanger 18 functions as an evaporator which exerts an endothermic action in the first heating operation mode and the second heating operation mode by letting the refrigerant evaporate. The external heat exchanger 18 functions as a radiator in the cooling operation mode by letting the high pressure refrigerant dissipate heat.

A refrigerant inlet side of the third compressor 20 is connected to a refrigerant outlet side of the external heat exchanger 18. The third decompressor 20 decompresses the refrigerant flowing out from the external heat exchanger 18 and flowing into the internal evaporator 22 in the cooling operation mode. As with the first decompressor 13, the third decompressor 20 is formed of an electrical expansion valve.

A refrigerant inlet side of the three-way valve 21 is connected to a refrigerant outlet side of the third decompressor 20. Two refrigerant outlets of the three-way valve 21 are respectively connected to a refrigerant inlet side of the internal evaporator 22 and a refrigerant inlet side of the accumulator 23. The three-way valve 21 switches between a refrigerant passage leading the refrigerant flowing out from the third decompressor 20 to the internal evaporator 22 and a second bypass passage 24 leading the refrigerant flowing out from the third decompressor 20 to the accumulator 23 by bypassing the internal evaporator 22.

The internal evaporator 22 is disposed upstream of the internal condenser 12 in the casing 31 of the internal air-conditioning unit 30 in a flow of air. The internal evaporator 22 is a heat exchanger allowing the refrigerant circulating inside and the interior blown air to exchange heat in the cooling operation mode to let the refrigerant evaporate by absorbing heat and to cool the interior blown air by an endothermic action of the refrigerant.

A refrigerant inlet side of the accumulator 23 is connected to a refrigerant outlet side of the internal evaporator 22 and the second bypass passage 24. The accumulator 23 is a gas-liquid separator separating a gas-liquid refrigerant flowing inside and accumulates a surplus refrigerant in the cycle. The intake port 11b of the electric compressor 11 is connected to a gas-phase refrigerant outlet of the accumulator 23.

The internal air-conditioning unit 30 will now be described. The internal air-conditioning unit 30 sends the temperature-regulated interior blown air into the compartment. The internal air-conditioning unit 30 is disposed on an inner side of an instrument panel provided at a forefront part in the compartment. The internal air-conditioning unit 30 includes the casing 31, an air blower 32, the internal condenser 12, and the internal evaporator 22.

An air pathway of the interior blown air is defined in the casing 31. An inside-outside air switching device 33 is disposed in the casing 31 at an uppermost stream end in a flow of the interior blown air. The inside-outside air switching device 33 switches between outside air and inside air as air to be introduced into the casing 31. Inside air is air inside the compartment. Outside air is air outside the compartment.

The air blower 32 blowing air drawn in via the inside-outside air switching device 33 into the compartment is disposed downstream of the inside-outside air switching device 33 in the flow of air. The air blower 32 is an electric air blower which drives a centrifugal multi-blade fan by using an electric motor.

The internal evaporator 22 and the internal condenser 12 are disposed downstream of the air blower 32 in the flow of air in an order of description in a direction of the flow of the interior blown air. A bypass pathway 34 is defied in the casing 31. The bypass pathway 34 is a pathway where the interior blown air which has passed through the internal evaporator 22 flows by bypassing the internal condenser 12.

An air pathway switching door 35 is disposed downstream of the internal evaporator 22 in the flow of air and upstream of the internal condenser 12 in the flow of air. The air pathway switching door 35 switches between an air pathway passing through the internal condenser 12 and the bypass pathway 34 as an air pathway where the interior blown air which has passed through the internal evaporator 22 flows.

An electrical configuration of the vehicle air-conditioning device 1 will now be described with reference to FIG. 5.

Figure 5:
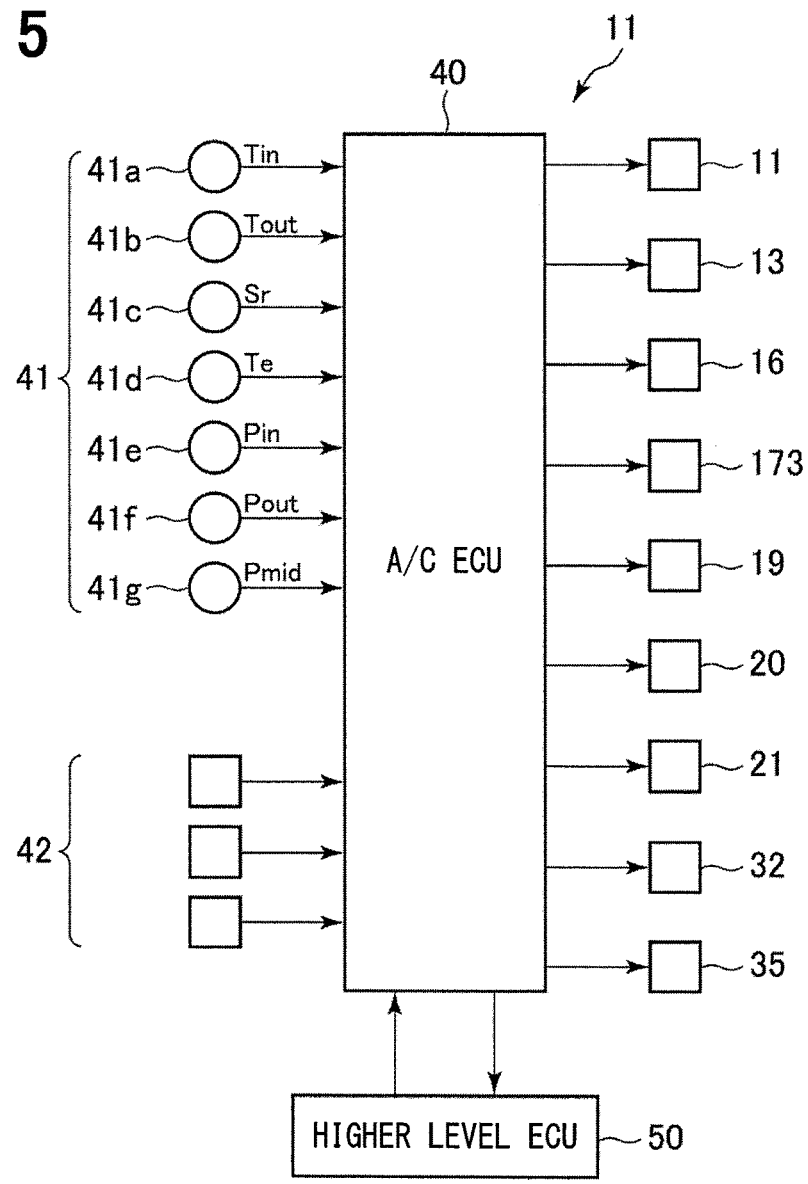
FIG. 5 is a block diagram showing an electrical configuration of the vehicle air-conditioning device of the embodiment.

As is shown in FIG. 5, the vehicle air-conditioning device 1 includes an air-conditioning control sensor group 41. The sensor group 41 includes an inside air sensor 41a, an outside air sensor 41b, an insolation sensor 41c, an evaporator temperature sensor 41d, a drawn pressure sensor 41e, a discharge pressure 41f, an intermediate pressure sensor 41g, and so on. The inside air sensor 41a detects a compartment internal temperature Tin. The outside air sensor 41b detects an outside air temperature Tout. The insolation sensor 41c detects an amount of insolation, Sr, in the compartment. The evaporator temperature sensor 41d detects a temperature Te of the internal evaporator 22. The drawn pressure sensor 41e detects a pressure Pin of the drawn refrigerant in the electric compressor 11. The discharge pressure 41f detects a pressure Pout of the discharge refrigerant from the electric compressor 11. The intermediate pressure sensor 41g detects a pressure Pmid of the intermediate pressure refrigerant in the electric compressor 11. The respective sensors 41a through 41g output detection signals corresponding to detected physical amounts.

The vehicle air-conditioning device 1 includes an operation switch 42. The operation switch 42 is disposed to an operation panel provided, for example, near the instrument panel. The operation switch 42 includes an operation switch of the vehicle air-conditioning device 1, a compartment internal temperature setting switch used to set the compartment internal temperature, a selection switch used to select the cooling operation mode and the heating operation mode, and so on. The operation switch 42 outputs an operation signal corresponding to an operation.

Detection signals from the sensor group 41 and an operation signal from the operation switch 42 are inputted into an air-conditioning ECU (Electronic Control Unit) 40. The air-conditioning ECU 40 is an electronic control device formed of a known micro-computer having a CPU, a ROM, a RAM, and so on and peripheral circuits. The air-conditioning ECU 40 controls the electric compressor 11, the first decompressor 13, the intermediate pressure on-off valve 16, the on-off valve 173, the blower fan 19, the third decompressor 20, the three-way valve 21, the air blower 32, the air pathway switching door 35, and so on by driving the respective components according to detection signals from the sensor group 41 and an operation signal from the operation switch 42.

The air-conditioning ECU 40 is electrically connected to a higher level ECU 50 to enable mutual communication. The higher level ECU 50 is an electronic control device controlling a running system of the vehicle. To be more specific, the higher level ECU 50 controls the main engine, such as the motor and the engine, and controls a supply of power to the main engine from the vehicle-mount battery according to a depression amount of an unillustrated accelerator pedal or the like.

The higher level ECU 50 outputs a stoppage signal of the electric compressor 11 to the air-conditioning ECU 40 when power needs to be secured during acceleration of the vehicle. Upon receipt of the stoppage signal sent from the higher level ECU 50, the air-conditioning ECU 40 forwards the stoppage signal to the electric compressor 11. The electric compressor 11 is thus stopped. When the electric compressor 11 is activated according to an operation signal or the like from the operation switch 42, the air-conditioning ECU 40 sends an activation signal to the electric compressor 11. The electric compressor 11 is thus activated.

A control on the respective components performed by the air-conditioning ECU 40 will now be described in detail.

The air-conditioning ECU 40 performs a normal operation control by which the respective components are controlled according any one of the cooling operation mode, the first heating operation mode, and the second heating operation mode. When the air-conditioning ECU 40 receives a stoppage signal of the electric compressor 11 from the higher level ECU 50, the air-conditioning ECU 40 suspends the electric compressor 11 by preferentially forwarding the stoppage signal to the electric compressor 11 over the normal operation control.

In the normal operation control, the air-conditioning ECU 40 switches the heat pump cycle 10 to the refrigerant circuits of the respective operation modes and controls operations of the respective components to obtain a desired air-conditioning state in each operation mode.

(A) Cooling Operation Mode

The cooling operation mode is started when the cooling operation mode is selected by the selection switch, for example, while the operation switch of the operation panel is ON.

In the cooling operation mode as is shown in FIG. 1, the air-conditioning ECU 40 controls the first decompressor 13 to be in the full open state and the third decompressor 20 in the throttle state. That is, the decompression action is not exerted in the first decompressor 13 whereas the decompression action is exerted in the third decompressor 20. Also, the air-conditioning ECU 40 controls the second decompressor 17 to be in the full open state by opening the on-off valve 173. That is, the decompression action is not exerted in the second decompressor 17. Further, the air-conditioning ECU 40 closes the intermediate pressure on-off valve 16 and closes the three-way valve 21 on the side of the second bypass passage 24.

The air-conditioning ECU 40 calculates a target blowing temperature TAO, which is a target temperature of air blown into the compartment, according to detection signals from the sensor group 41 and an operation signal from the operation panel. The air-conditioning ECU 40 determines operation states of the respective components, such as the electric compressor 11, the air blower 32, and the air pathway switching door 35, according to the calculated target blowing temperature TAO and detection signals from the sensor group 41, and outputs control signals for the determined operation states to the respective components. Hence, the air-conditioning ECU 40 controls, for example, the electric compressor 11 and the air blower 32 individually to operate at desired rotation speeds while setting a door position of the inside-outside air switching device 33 and a position of the air pathway switching door 35 to respective desired positions. To be exact, the air pathway switching door 35 is set at a position at which the air pathway switching door 35 closes an air pathway of the internal condenser 12, in other words, at a position at which the air pathway switching door 35 allows entire blown air which has passed through the internal evaporator 22 to pass through the bypass path 34.

Accordingly, the heat pump cycle 10 is switched to the refrigerant circuit of the cooling operation mode shown in FIG. 1, in which the refrigerant flows as is indicated by a thick line and arrows. That is, the refrigerant discharged from the discharge port 11c of the electric compressor 11 flows back into the intake port 11b of the electric compressor 11 by sequentially flowing through the internal condenser 12, the first decompressor 13, the gas-liquid separator 14, the second decompressor 17, the external heat exchanger 18, the third decompressor 20, the internal evaporator 22, and the accumulator 23.

In the refrigerant operation mode, the high pressure refrigerant discharged from the discharge port 11c of the electric compressor 11 dissipates heat by exchanging heat with outside air in the external heat exchanger 18. The refrigerant flowing out from the external heat exchanger 18 is expanded by decompression in the third decompressor 20 until the refrigerant turns into the low pressure refrigerant, and evaporates in the internal evaporator 22 by absorbing heat from the interior blown air blown by the air blower 32. The interior blown air is thus cooled. Because the air pathway of the internal condenser 12 is closed by the air pathway switching door 35, the high pressure refrigerant flowing into the internal condenser 12 flows out from the internal condenser 12 by dissipating substantially no heat to the interior blown air. Hence, the interior blown air cooled in the internal evaporator 22 is blown into the compartment.

(B) Heating Operation Mode

The heating operation mode is started when the heating operation mode is selected by the selection switch, for example, while the operation switch of the operation panel is ON. The first heating operation mode is executed when the outside air temperature is extremely low and the second heating operation mode is executed otherwise. For example, the air-conditioning ECU 40 executes the first heating operation mode when a detection temperature of the outside air sensor 41b is not higher than a reference temperature, for example, 0 [° C.], and executes the second heating operation mode when a detection temperature of the outside air sensor 41b exceeds the reference temperature.

(B1) First Heating Operation Mode

In the first heating operation mode as is shown in FIG. 2, the air-conditioning ECU 40 controls the first decompressor 13 to be in the throttle state and the third decompressor 20 in the full open state. Also, the air-conditioning ECU 40 controls the second decompressor 17 to be in the throttle state by closing the on-off valve 173. Further, the air-conditioning ECU 40 opens the intermediate pressure on-off valve 16 and opens the three-way valve 21 on the side of the second bypass passage 24.

As in the cooling operation mode, the air-conditioning ECU 40 determines operation states of the respective components according to the target blowing temperature TAO and the like and outputs control signals for the determined operation states to the respective components. Accordingly, for example, the air pathway switching door 35 is set to a position at which the air pathway switching door 35 closes the bypass pathway 34, in other words, set to a position at which the air pathway switching door 35 allows entire blown air which has passed through the internal evaporator 22 to pass through the internal condenser 12.

Hence, the heat pump cycle 10 is switched to the refrigerant circuit of the first heating operation mode shown in FIG. 2, in which the refrigerant flows as is indicated by a thick line and arrows. The refrigerant circuit of the first heating operation mode forms a gas injection cycle. That is, the high pressure refrigerant discharged from the discharge port 11c of the electric compressor 11 is condensed in the internal condenser 12 and the condensed high pressure refrigerant is decompressed in the first decompressor 13 until the high pressure refrigerant turns into the intermediate pressure refrigerant. The intermediate pressure refrigerant flowing out from the first decompressor 13 is separated to a gas-phase refrigerant and a liquid-phase refrigerant in the gas-liquid separator 14. The intermediate pressure liquid-phase refrigerant separated in the gas-liquid separator 14 is decompressed in the second decompressor 17 until the intermediate pressure liquid-phase refrigerant turns into the low pressure refrigerant. Subsequently, the low pressure refrigerant is evaporated in the external heat exchanger 18 and drawn into the intake port 11b of the electric compressor 11 via the accumulator 23. Meanwhile, the intermediate pressure gas-phase refrigerant separated in the gas-liquid separator 14 is led to the intermediate pressure port 11d of the electric compressor 11 via the intermediate pressure refrigerant passage 15 and combined with the refrigerant in the compression process.

As has been described, in the first heating operation mode, the gas injection cycle is formed, in which the low pressure refrigerant decompressed in the second decompressor 17 is drawn into the electric compressor 11 while the intermediate pressure refrigerant decompressed in the first decompressor 13 is combined with the refrigerant in the compression process in the electric compressor 11. Hence, in the present embodiment, the first heating operation mode corresponds to a two-step compression mode in which the intermediate pressure refrigerant is introduced into the compression portion 111 of the electric compressor 11.

In the first heating operation mode, because the refrigerant does not flow through the internal evaporator 22, the interior blown air is not cooled in the internal evaporator 22. After the interior blown air passes through the internal evaporator 22, the interior blown air is heated in the internal condenser 12 by exchanging heat with the high pressure refrigerant and blown into the compartment.

(B2) Second Heating Operation Mode

In the second heating operation mode as is shown in FIG. 3, the air-conditioning ECU 40 controls the first decompressor 13 to be in the throttle state and the third decompressor 20 in the full open state. Also, the air-conditioning ECU 40 controls the second decompressor 17 to be in the full open state by opening the on-off valve 173. Further, the air-conditioning ECU 40 closes the intermediate pressure on-off valve 16 and opens the three-way valve 21 on the side of the second bypass passage 24.

As in the first heating operation mode, the air-conditioning ECU 40 determines operation states of the respective components according to the target blowing temperature TAO and the like and outputs control signals for the determined operation states to the respective components.

Hence, the heat pump cycle 10 is switched to the refrigerant circuit of the second heating operation mode shown in FIG. 3, in which the refrigerant flows as is indicated by a thick line and arrows. That is, the high pressure refrigerant discharged from the discharge port 11*c* of the electric compressor 11 is condensed in the internal condenser 12 and the condensed high pressure refrigerant is decompressed in the first decompressor 13 until the high pressure refrigerant turns into the low pressure refrigerant. The low pressure refrigerant flowing out from the first decompressor 13 flows into the gas-liquid separator 14. Because the intermediate pressure on-off valve 16 is closed, the low pressure refrigerant flowing into the gas-liquid separator 14 does not flow into the intermediate pressure refrigerant passage 15 and flows into the external heat exchanger 18. The refrigerant flowing into the external heat exchanger 18 is evaporated by a heat exchanger with outside air and drawn into the intake port 11*b* of the electric compressor 11 via the accumulator 23.

The interior blown air is not cooled in the internal evaporator 22 in the second heating operation mode, either, because the refrigerant does not flow through the internal evaporator 22. After the interior blown air passes through the internal evaporator 22, the interior blown air is heated in the internal condenser 12 by exchanging heat with the high pressure refrigerant and blown into the compartment.

As has been described, in the present embodiment, the cooling operation mode and the second heating operation mode correspond to a one-step compression mode in which the intermediate pressure refrigerant is not introduced into the compression portion 111 of the electric compressor 11.

An electrical configuration of the electric compressor 11 will now be described in detail with reference to FIG. 6.

Figure 6:
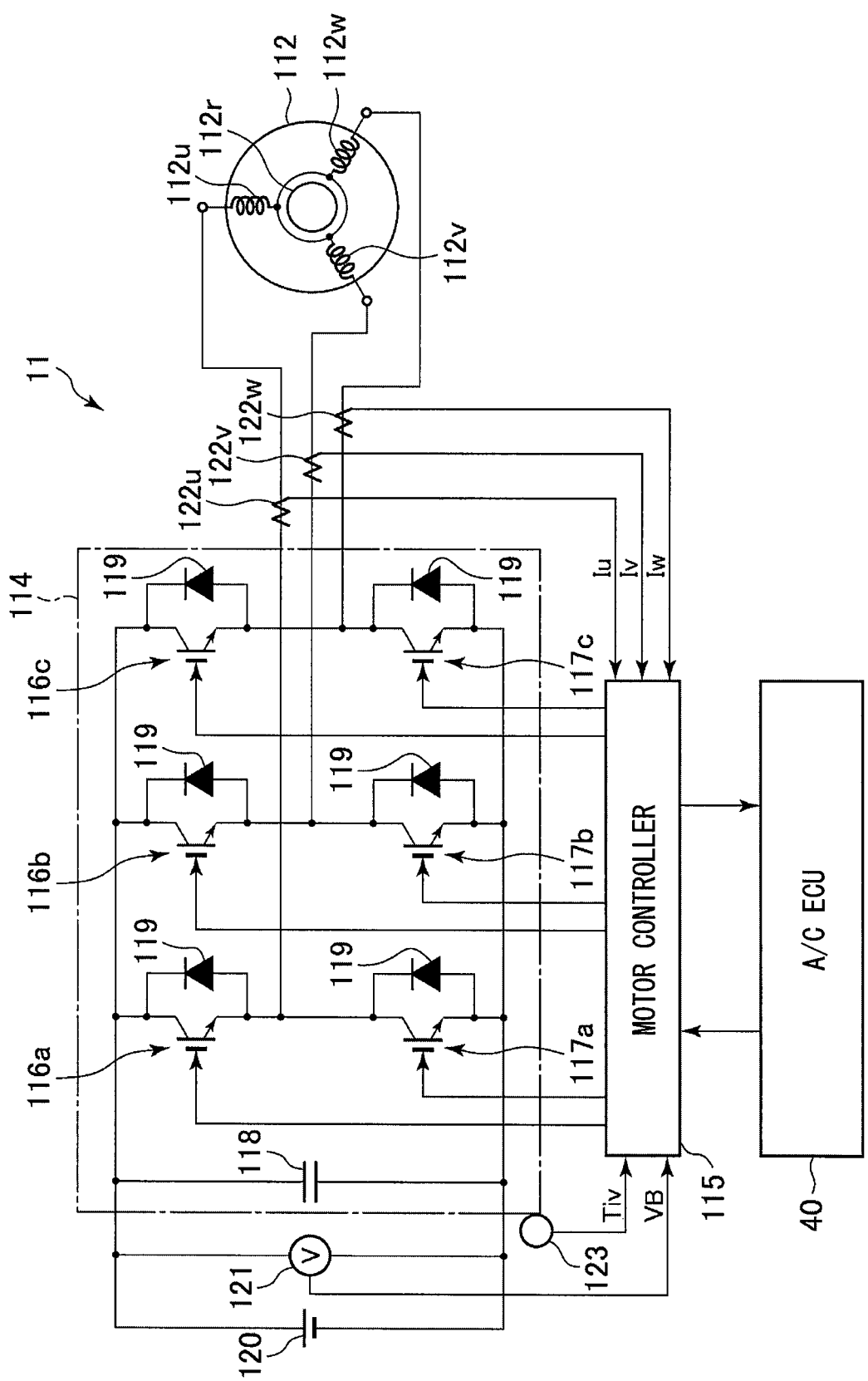
FIG. 6 is a block diagram showing an electrical configuration of the electric compressor of the embodiment.

As is shown in FIG. 6, the electric compressor 11 includes an inverter circuit 114 and a motor controller 115. In the present embodiment, the inverter circuit 114 corresponds to a motor drive circuit.

The inverter circuit 114 has switching elements 116*a* through 116*c* of an upper arm, switching elements 117*a* through 117*c* of a lower arm, and a current smoothing capacitor 118. A diode 119 is connected to each of the switching elements 116*a* through 116*c* of the upper arm and the switching elements 117*a* through 117*c* of the lower arm. The diode 119 flows a counter-electromotive force generated in the electric motor 112 backward to a battery 120 which is a DC power supply installed to the vehicle.

Base sides of the switching elements 116*a* through 116*c* of the upper arm and the switching elements 117*a* through 117*c* of the lower arm are connected to the motor controller 115. Collector sides of the switching elements 116*a* through 116*c* of the upper arm are connected to a high-potential terminal of the battery 120. Emitter sides of the switching elements 116*a*, 116*b*, and 116*c* of the upper arm are connected, respectively, to a U-phase coil 112*u*, a V-phase coil 112*v*, and a W-phase coil 112*w* of the electric motor 112. Emitter sides of the switching elements 117*a* through 117*c* of the lower arm are connected to a low-potential terminal of the battery 120. Collector sides of the switching elements 117*a* through 117*c* of the lower arm are connected, respectively, to the coils 112*u* through 112*w* of the respective phases.

In the inverter circuit 114, three-phase AC power is generated from DC power of the battery 120 by switching ON and OFF the switching elements 116*a* through 116*c* and 117*a* through 117*c* according to a PWM drive signal sent from the motor controller 115. When the three-phase AC power generated in the inverter circuit 114 is supplied to the coils 112*u* through 112*w* of the respective phases of the electric motor 112, a rotating field is generated by the coils 112*u* through 112*w* of the respective phases. A rotor 112*r* having permanent magnets or the like rotates due to the rotating field acting on the rotor. The compression portion 111 rotates with rotations of the rotor 112*r* and the refrigerant is thus compressed by the electric compressor 11.

The electric compressor 11 is provided with a voltage sensor 121, current sensors 122*u* through 122*w*, and a temperature sensor 123. The voltage sensor 121 detects a voltage value VB of the battery 120. The current sensors 122*u* through 122*w* respectively detect current values Iu through Iw of the respective phases supplied from the inverter circuit 114 to the electric motor 112. The temperature sensor 123 detects a temperature Tiv of the inverter circuit 114. Output signals of the respective sensors 121, 122*u* through 122*w*, and 123 are inputted into the motor controller 115.

The air-conditioning ECU 40 sets a target rotation speed of the electric compressor 11, in other words, a target rotation speed of the rotor 112*r* according to detection signals from the sensor group 41 and an operation signal from the operation switch 42 and sends the set target rotation speed to the motor controller 115.

The motor controller 115 is an electronic control device formed of a known microcomputer having a CPU, a ROM, a RAM, and so on and peripheral circuits. The motor controller 115 estimates a rotation speed of the rotor 112*r* according to the battery value VB of the battery 120 detected by the voltage sensor 121 and the current values Iu through Iw of the respective phases detected by the current sensors 122*u* through 122*w*, respectively. The motor controller 115 generates a PWM drive signal by performing a feedback control, by which the estimated rotation speed is controlled to follow the target rotation speed. The motor controller 115 applies a PWM control on the electric motor 112 by outputting the PWM drive signal to the switching elements 116*a* through 116*c* and 117*a* through 117*c* of the inverter circuit 114. A rotation speed of the rotor 112*r* is thus controlled to follow the target rotation speed. That is, the motor controller 115 performs so-called a sensor-less control, by which rotations of the rotor 112*r* are controlled without using a rotation sensor detecting a rotational position of the rotor 112*r*.

A drive control on the electric motor 112 performed by the motor controller 115 will now be described in detail with reference to FIG. 7. The motor controller 115 repetitively performs processing depicted in FIG. 7 with a predetermined period.

Figure 7:
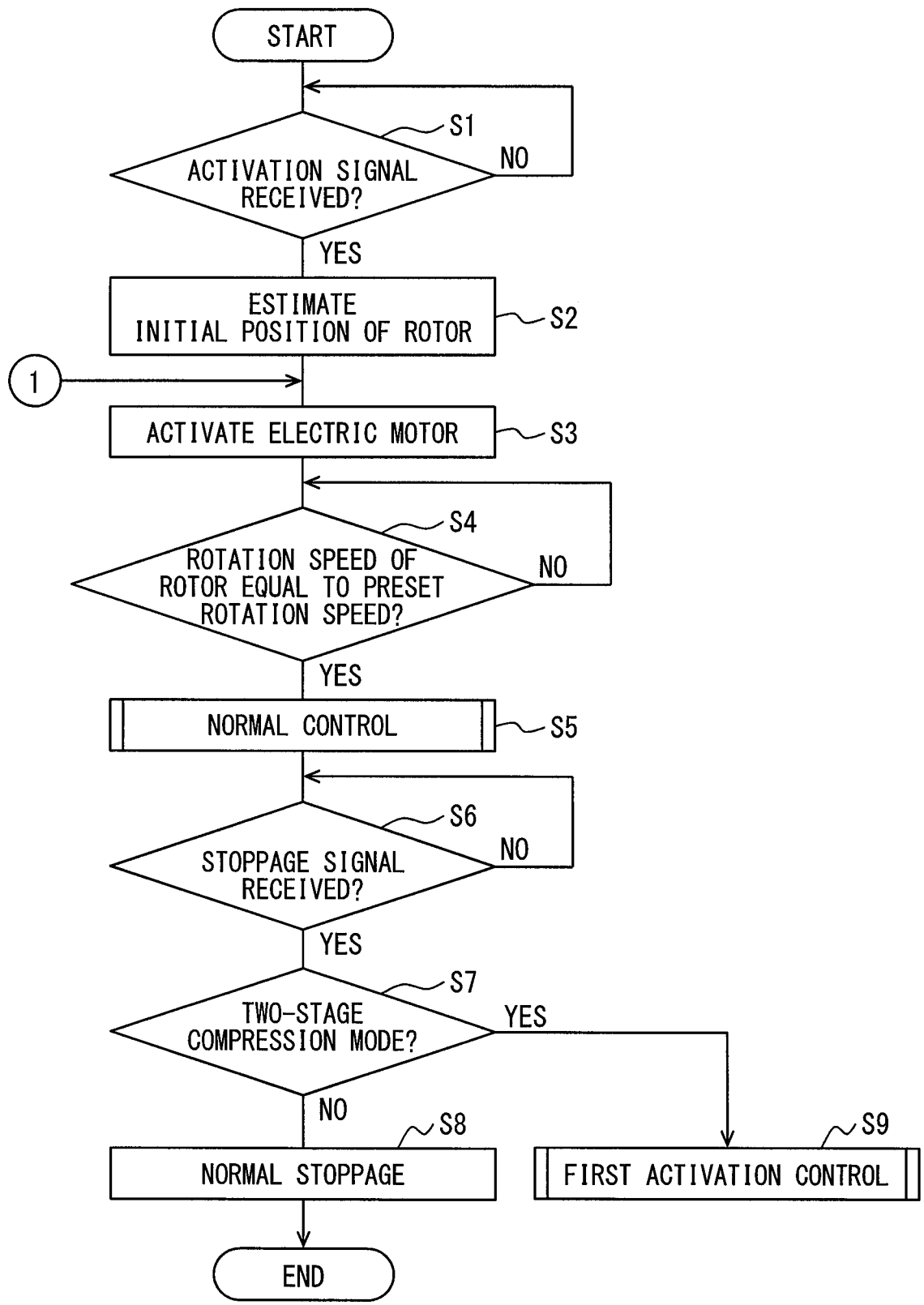
FIG. 7 is a flowchart depicting a processing procedure of a drive control on an electric motor performed by a motor controller of the embodiment.

As is depicted in FIG. 7, the motor controller 115 first determines whether an activation signal sent from the air-conditioning ECU 40 is received as processing in Step S1. When a positive determination is made by the processing in Step S1, the motor controller 115 estimates an initial position of the rotor 112*r* as processing in Step S2. For example, the motor controller 115 drives the inverter circuit 114 to apply a high-frequency voltage to the coils 112*u* through 112*w* of the respective phase of the electric motor 112. The motor controller 115 estimates an initial rotational position of the rotor 112r according to the current values Iu through Iw of the respective phases detected by the current sensors 122u through 122w, respectively, when a high-frequency voltage is applied to the coils 112u through 112w of the respective phases.

The motor controller 115 activates the electric motor 112 as processing in Step S3 following the processing in Step S2. More specifically, the motor controller 115 drives the inverter circuit 114 for a rotating field capable of rotating the rotor 112r to be generated by the coils 112u through 112w of the respective phases based on the initial rotational position of the rotor 112r acquired by the processing in Step S2. The rotor 112r is thus rotated and hence the electric motor 112 is actuated.

The motor controller 115 determines whether a rotation speed of the rotor 112r has reached a preset rotation speed as processing in Step S4 following the processing in Step S3. More specifically, the motor controller 115 estimates a rotation speed of the rotor 112r according to the voltage value VB of the battery 120 and the current values Iu through Iw of the respective phases, and determines whether the estimated rotation speed of the rotor 112r has reached the preset rotation speed. The preset rotation speed is preliminarily set by a test or the like to make a determination as to whether a rotation speed of the rotor 112r has risen to a rotation speed at or above which the sensor-less control can be performed in a stabile manner.

When a positive determination is made by the processing in Step S4, the motor controller 115 performs a normal control on the electric motor 112 as processing in Step S5. The normal control of the present embodiment corresponds to the sensor-less control on the electric motor 112.

The motor controller 115 determines whether a stoppage signal sent from the air-conditioning ECU 40 is received while the normal control on the electric motor 112 is performed as processing in Step S6. When a positive determination is made by the processing in Step S6, the motor controller 115 determines whether the heat pump cycle 10 is driven in the two-step compression mode as processing in Step S7. More specifically, the motor controller 115 acquires information on whether the heat pump cycle 10 is driven in the two-step compression mode from the air-conditioning ECU 40 and performs the processing in Step S7 according to the acquired information.

In a case where the heat pump cycle 10 is not driven in the two-step compression mode, that is, in a case where the heat pump cycle 10 is driven in the one-step compression mode, the motor controller 115 makes a negative determination by the processing in Step S7. In such a case, the motor controller 115 stops the electric motor 112 in a normal manner as processing in Step S8. That is, the motor controller 115 stops the electric motor 112 by stopping a supply of power to the electric motor 112.

When a positive determination is made by the processing in Step S7, the motor controller 115 performs a first activation control as processing in Step S9. A processing procedure of the first activation control is depicted in FIG. 8.

Figure 8:
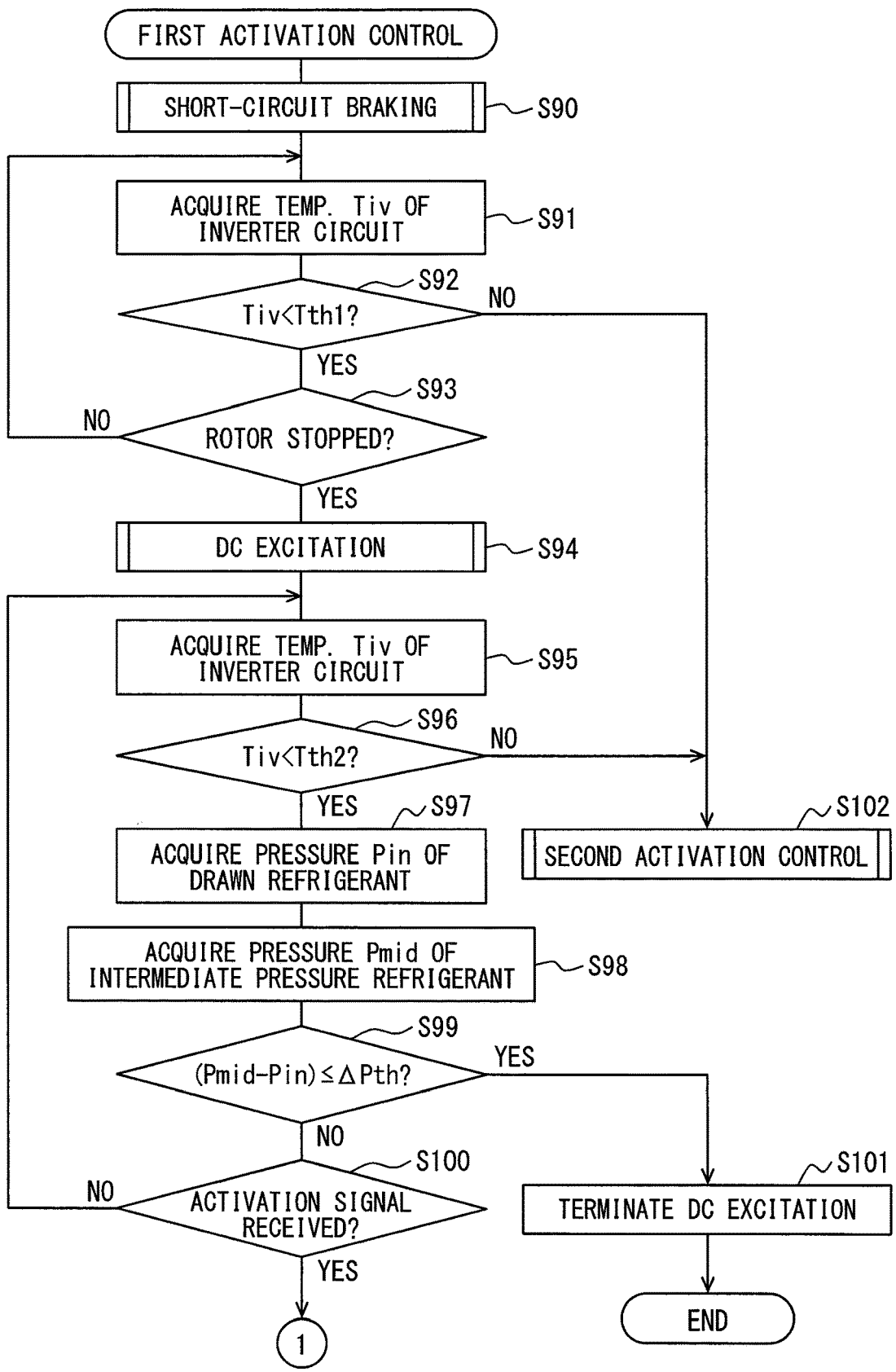
FIG. 8 is a flowchart depicting a processing procedure of a first activation control performed by the motor controller of the embodiment.

In the first activation control as is depicted in FIG. 8, the motor controller 115 first applies short-circuit braking on the electric motor 112 as processing in Step S90. More specifically, the motor controller 115 switches ON all the switching elements 116a through 116c of the upper arm and switches OFF all the switching elements 117a through 117c of the lower arm in the inverter circuit 114, or conversely, the motor controller 115 switches OFF all the switching elements 116a through 116c of the upper arm and switches ON all the switching elements 117a through 117c of the lower arm in the inverter circuit 114. Accordingly, a current opposite to a current flowing when the rotor 112r is rotating flows to the coils 112u through 112w of the respective phases. Hence, a braking force is applied to the rotor 112r and the rotor 112r can be stopped.

The motor controller 115 acquires the temperature Tiv of the inverter circuit 114 from the temperature sensor 123 as processing in Step S91 following the processing in Step S90. Also, the motor controller 115 determines whether the temperature Tiv of the inverter circuit 114 is below a temperature threshold Tth1 as processing in Step S92 following the processing in Step S91. The temperature threshold Tth1 is preliminarily set by a test or the like to make a determination as to whether the inverter circuit 114 may possibly be damaged by heat generated in the inverter circuit 114 while short-circuit braking is applied on the electric motor 112. In the present embodiment, the temperature threshold Tth1 corresponds to a temperature threshold of short-circuit braking.

When a positive determination is made by the processing in Step S92, the motor controller 115 determines whether the rotor 112r has stopped as processing in Step S93. More specifically, the motor controller 115 determines whether the rotor 112r has stopped according to a rotation speed of the rotor 112r estimated from the voltage value VB of the battery 120 and the current values Iu through Iw of the respective phases. When a positive determination is made by the processing in Step S92 and a negative determination is made by the processing in Step S93, the motor controller 115 returns to the processing in Step S91.

When a positive determination is made by the processing in Step S93, the motor controller 115 applies direct current excitation on the electric motor 112 as processing in Step S94. More specifically, the motor controller 115 drives the inverter circuit 114 to form a unidirectional field by direct current excitation and fixes the rotor 112r to a particular phase. Accordingly, a rotational position of the rotor can be fixed to a predetermined rotational position corresponding to the unidirectional field formed by direct current excitation.

The motor controller 115 acquires the temperature Tiv of the inverter circuit 114 from the temperature sensor 123 as processing in Step S95 following the processing in Step S94. Also, the motor controller 115 determines whether the temperature Tiv of the inverter circuit 114 is below a temperature threshold Tth2 as processing in Step S96 following Step S95. The temperature threshold Tth2 is preliminarily set by a test or the like to make a determination as to whether the inverter circuit 114 may possibly be damaged by heat generated in the inverter circuit 114 while direct current excitation is applied on the electric motor 112. In the present embodiment, the temperature threshold Tth2 corresponds to a temperature threshold of direct current excitation.

When a positive determination is made by the processing in Step S96, that is, when it can be determined that the inverter circuit 114 is unsusceptible to heat-induced damage, the motor controller 115 acquires information on a pressure Pin of the drawn refrigerant and a pressure Pmid of the intermediate pressure refrigerant of the electric compressor 11 from the air-conditioning ECU 40 as processing in Step S97 and processing in Step S98, respectively.

The motor controller 115 computes a difference (Pmid−Pin) between the pressure Pin of the drawn refrigerant and the pressure Pmid of the intermediate pressure refrigerant and determines whether the difference (Pmid−Pin) is at or below a predetermine threshold Pth as processing in Step S99 following Step S98. The pressure threshold Pth is preliminarily set by a test or the like to make a determination as to whether the pressure Pmid of the intermediate pressure refrigerant has decreased to a pressure level incapable of causing backward rotation of the rotor 112r.

When a negative determination is made by the processing in Step S99, the motor controller 115 determines whether an activation signal sent from the air-conditioning ECU 40 is received as processing in Step S100. When a negative determination is made by the processing in Step S100, the motor controller 115 returns to the processing in Step S95. That is, in a case where the activation signal is not received in a circumstance where the rotor 112r may possibly rotate backward, the motor controller 115 returns to the processing in Step S95.

When a positive determination is made by the processing in Step S100, that is, when the activation signal is received in a circumstance where the rotor 112r may possibly rotate backward, the motor controller 115 returns to the processing in Step S3 of FIG. 7 and activates the electric motor 112. In such a case, the motor controller 115 activates the electric motor 112 by forming a rotating field with the coils 112u through 112w of the respective phases based on the predetermined rotational position of the rotor 112r fixed by direct current excitation.

When a positive determination is made in Step S99 of FIG. 8, that is, when the rotor 112r has no possibility of rotating backward, the motor controller 115 terminates direct current excitation applied on the electric motor 112 and ends a sequence of processing steps as processing in Step S101.

When a negative determination is made by the processing in Step S92 or by the processing in Step S96, that is, when the inverter circuit 114 is susceptible to heat-induced damage, the motor controller 115 performs a second activation control as processing in Step S102. A processing procedure of the second activation control is depicted in FIG. 9.

Figure 9:
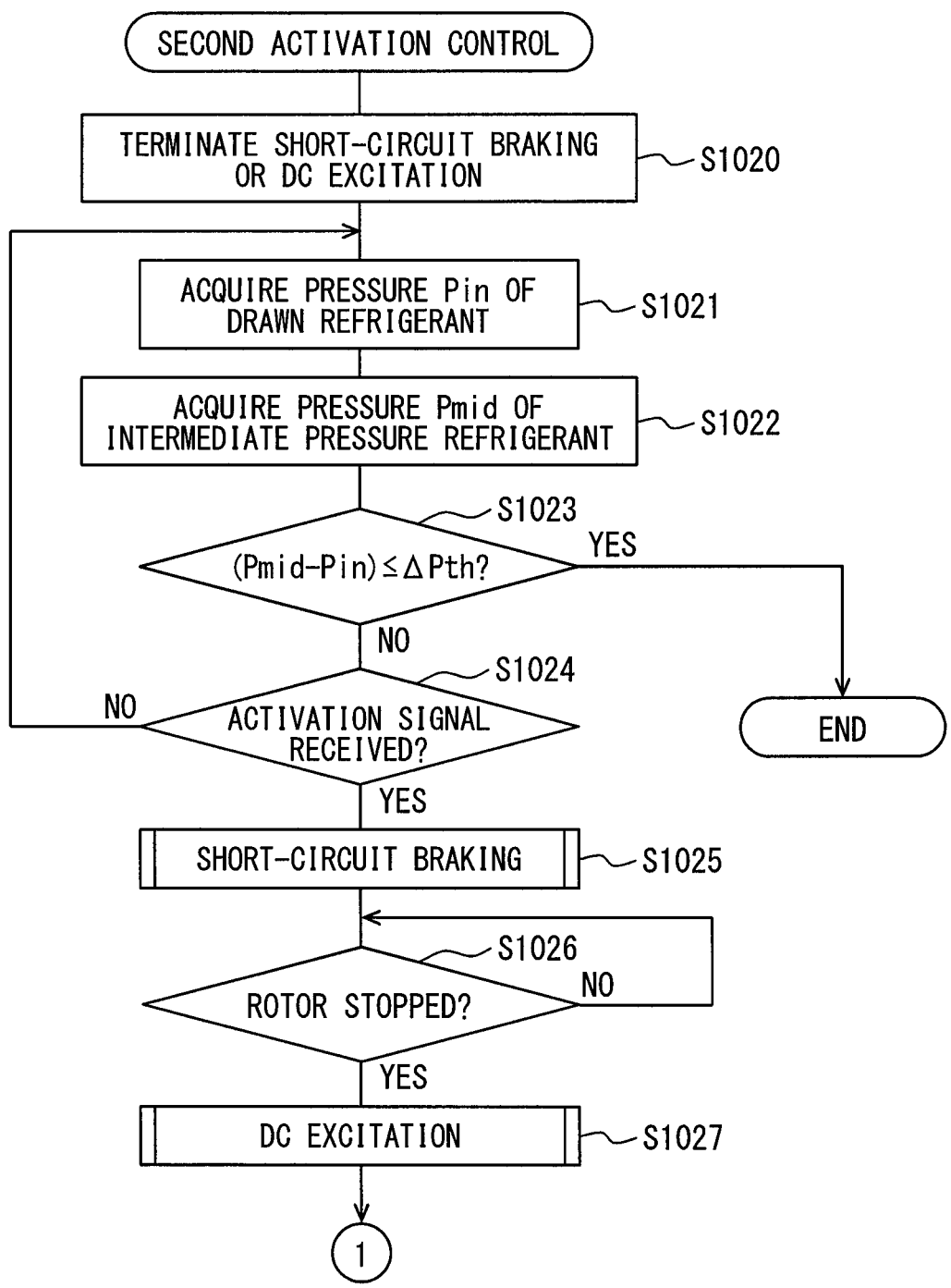
FIG. 9 is a flowchart depicting a processing procedure of a second activation control performed by the motor controller of the embodiment.

In the second activation control as is depicted in FIG. 9, the motor controller 115 first terminates short-circuit braking or direct current excitation applied on the electric motor 112 as processing in Step S1020. For example, in a case where the second activation control is performed because a negative determination is made by the processing in Step S92 of FIG. 8, the motor controller 115 is performing short-circuit braking on the electric motor 112. In such a case, the motor controller 115 terminates short-circuit braking applied on the electric motor 112 as the processing in Step S1020. Meanwhile, in a case where the second activation control is performed because a negative determination is made by the processing in Step S96 of FIG. 8, the motor controller 115 is performing direct current excitation on the electric motor 112. In such a case, the motor controller 115 terminates direct current excitation applied on the electric motor 112 as the processing in Step S1020.

The motor controller 115 acquires information on the pressure Pin of the drawn refrigerant and the pressure Pmid of the intermediate pressure refrigerant of the electric compressor 11 from the air-conditioning ECU 40, respectively, as processing in Step S1021 following the processing in Step S1020 and processing in subsequent Step S1022.

The motor controller 115 computes a difference (Pmid−Pin) between the pressure Pin of the drawn refrigerant and the pressure Pmid of the intermediate pressure refrigerant and determines whether the difference (Pmid−Pin) has decreased to or below the pressure threshold Pth as processing in Step S1023 following Step S1022.

When a negative determination is made by the processing in Step S1023, the motor controller 115 determines whether an activation signal sent from the air-conditioning ECU 40 is received as processing in Step S1024. When a negative determination is made by the processing in Step S1024, the motor controller 115 returns to the processing in Step S1021. That is, when the activation signal is not received in a circumstance where the rotor 112r may possibly rotate backward, the motor controller 115 returns to the processing in Step S1021.

When a positive determination is made by the processing in Step S1023, that is, when the rotor 112r has no possibility of rotating backward, the motor controller 115 ends a sequence of processing steps.

When a positive determination is made by the processing in Step S1024, that is, when the activation signal is received in a circumstance where the rotor 112r may possibly rotate backward, the motor controller 115 stops the electric motor 112 by performing short-circuit braking on the electric motor 112 as processing in Step S1025 in a same manner as in the processing in Step S90. The motor controller 115 determines whether the rotor 112r has stopped as processing in Step S1026 following Step S1025 in a same manner as in the processing in Step S93. When a positive determination is made by the processing in Step S1026, that is, when the rotor 112r has stopped, the motor controller 115 applies direct current excitation on the electric motor 112 as processing in Step S1027 in a same manner as in the processing of Step S94. The motor controller 115 then returns to the processing in Step S3 of FIG. 7 and activates the electric motor 112. In such a case, the motor controller 115 activates the electric motor 112 by forming a rotating field with the coils 112u through 112w of the respective phases based on the predetermined rotational position of the rotor 112r fixed by direct current excitation.

According to the electric compressor 11 of the present embodiment described as above, functions and effects as set forth in the following (1) through (7) can be obtained.

(1) In a case where the electric motor 112 is stopped in the two-step compression mode, the motor controller 115 first stops the rotor 112r rotating by performing short-circuit braking on the electric motor 112 and then fixes a rotational position of the rotor 112r to a predetermined rotational position by performing direct current excitation on the electric motor 112. Accordingly, even when the pressure Pmid of the intermediate pressure refrigerant is higher than the pressure Pin of the drawn pressure to some extent, backward rotations of the rotor 112r can be restricted, which can in turn restrict a step-out of the electric motor 112 when reactivated.

(2) In a case where the electric motor 112 is reactivated after direct current excitation is applied on the electric motor 112, the motor controller 115 activates the electric motor 112 based on the predetermined rotational position of the rotor 112r fixed by direct current excitation. Hence, the electric motor 112 can be readily reactivated while restricting a step-out.

(3) The motor controller 115 terminates direct current excitation applied on the electric motor 112 according to a determination that the pressure Pmid of the intermediate pressure refrigerant has decreased to a pressure at or below which the rotor 112r is not rotated backward while direct current excitation is applied to the electric motor 112. Hence, an unwanted circumstance that direct current excitation is kept applied on the electric motor 112 even when the rotor 112r does not rotate backward can be avoided, which can in turn avoid wasteful power consumption.

(4) The motor controller 115 terminates short-circuit braking applied on the electric motor 112 when the temperature Tiv of the inverter circuit 114 rises to or above the temperature threshold Tth1 while short-circuit braking is applied to the electric motor 112. Hence, short-circuit braking applied on the electric motor 112 is terminated when the temperature of the inverter circuit 114 rises due to short-circuit braking applied on the electric motor 112, which can in turn restrict heat-induced damaged on the inverter circuit 114.

(5) The motor controller 115 terminates direct current excitation applied on the electric motor 112 when the temperature Tiv of the inverter circuit 114 rises to or above the temperature threshold Tth2 while direct current excitation is applied to the electric motor 112. Hence, direct current excitation applied on the electric motor 112 is terminated when a temperature of the inverter circuit 114 rises due to direct current excitation applied on the electric motor 112, which can in turn restrict heat-induced damage on the inverter circuit 114.

(6) In a case where the electric motor 112 is reactivated before a pressure difference (Pmid−Pin) decreases to or below the pressure threshold Pth after short-circuit braking or direct current excitation applied on the electric motor 112 is terminated, the motor controller 115 applies short-circuit braking on the electric motor 112 first and then applies direct current excitation on the electric motor 112. The motor controller 115 subsequently reactivates the electric motor 112 based on the predetermined rotational position of the rotor 112r fixed by direct current excitation. Hence, the electric motor 112 can be activated while restricting a step-out even when the electric motor 112 is reactivated before the pressure Pmid of the intermediate pressure refrigerant decreases to a pressure at or below which the rotor 112r is not rotated backward.

(7) The motor controller 115 determines that the pressure Pmid of the intermediate pressure refrigerant has decreased to a pressure at or below which the rotor 112r is not rotated backward when a difference (Pmid−Pin) between the pressure Pin of the drawn refrigerant and the pressure Pmid of the intermediate pressure refrigerant decreases to or below the pressure threshold Pth. Hence, a determination can be readily made as to whether the pressure Pmid of the intermediate pressure refrigerant has decreased to a pressure at or below which the rotor 112r is not rotated backward.

The embodiment described above may be modified as follows and implemented as other embodiments.

Figure 10:
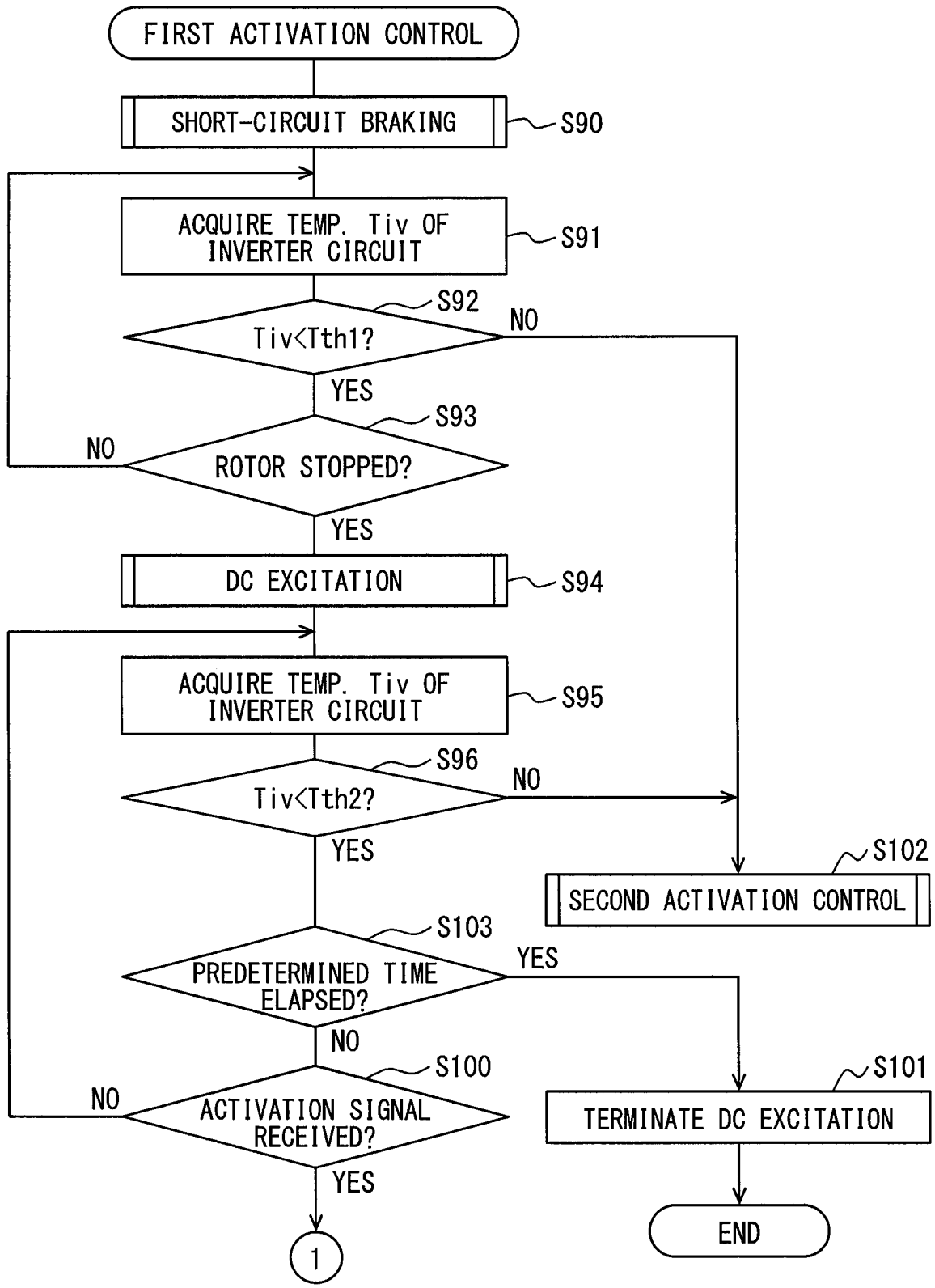
FIG. 10 is a flowchart depicting a processing procedure of the first activation control performed by a motor controller of another embodiment.
Figure 11:
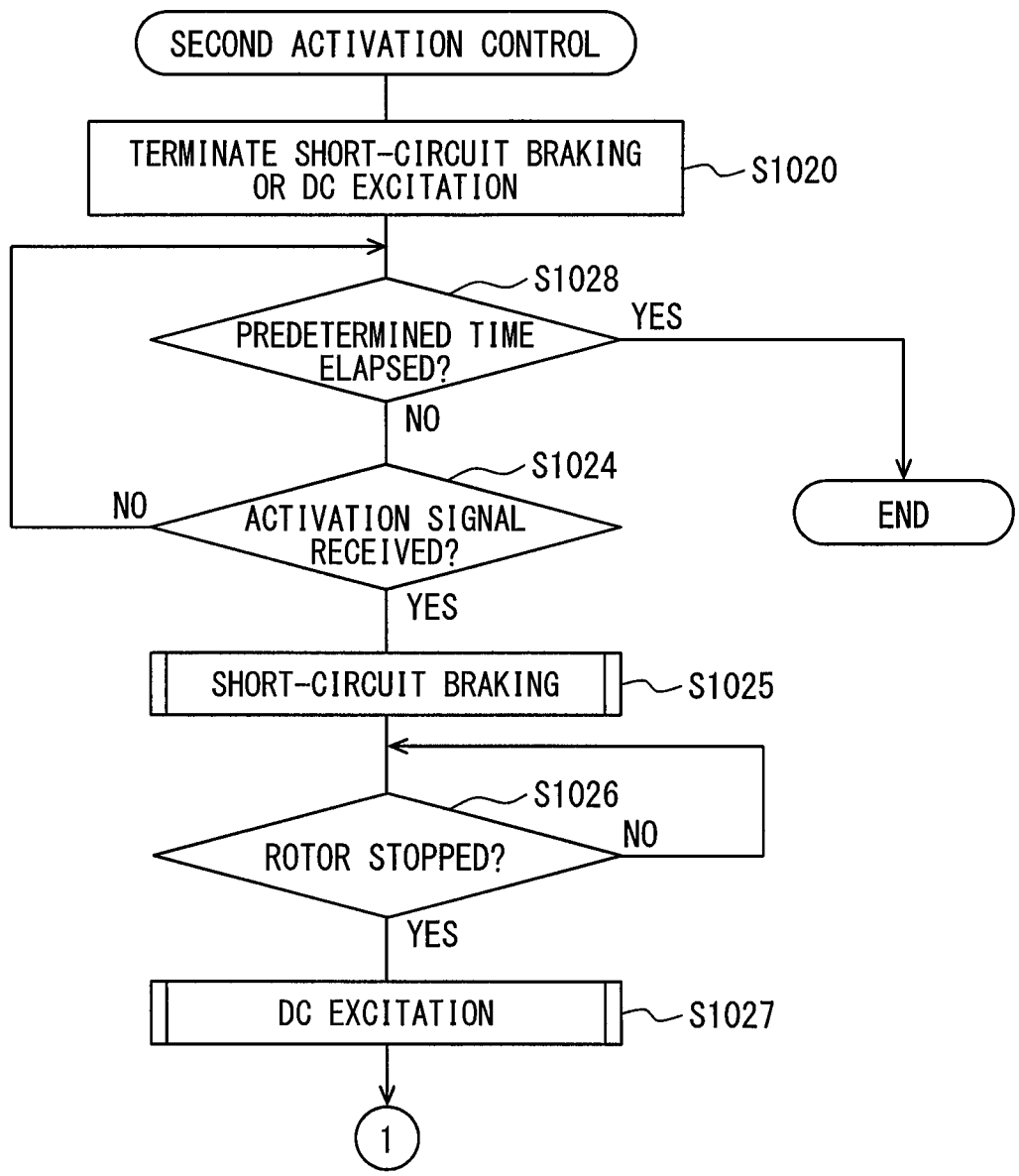
FIG. 11 is a flowchart depicting a processing procedure of the second activation control performed by the motor controller of another embodiment.

The motor controller 115 may determine that the pressure Pmid of the intermediate pressure refrigerant has decreased to a pressure at or below which the rotor 112r is not rotated backward when a predetermined time has elapsed after application of direct current excitation is started. In such a case, for example, as is depicted in FIG. 10, the motor controller 115 performs processing to determine whether a predetermined time has elapsed after application of direct current excitation is started as processing in Step S103 instead of the processing in Step S99 of FIG. 8. Likewise, as is depicted in FIG. 11, the motor controller 115 performs processing to determine whether a predetermined time has elapsed after application of direct current excitation is started instead of the processing in Step S1023 of FIG. 9. Even when the configuration is modified as above, a determination can be readily made as to whether the pressure Pmid of the intermediate pressure refrigerant has decreased to a pressure at or below which the rotor 112r is not rotated backward.

The motor controller 115 may estimate a force acting on the rotor 112r in a backward rotating direction according to information on the current values Iu through Iw of the respective phases and a rotation speed of the rotor 112r immediately before the electric motor 112 stops, and so on, and set a predetermined time used in Step S103 of FIG. 10 and Step S1028 of FIG. 11 according to the estimated backward rotating force. In short, the motor controller 115 may set an application time of direct current excitation according to the estimated backward rotating force. Likewise, the motor controller 115 may set an application time of short-circuit braking according to the estimated backward rotating force.

The motor controller 115 may set magnitude of an exciting current of the electric motor 112 during direct current excitation according to the estimated backward rotating force. Alternatively, the motor controller 115 may reduce magnitude of an exciting current of the electric motor 112 during direct current excitation with time.

The motor controller 115 may perform the processing in Step S7 of FIG. 7 by determining whether the heat pump cycle 10 is driven in the two-step compression mode according to information on, for example, the current values Iu through Iw of the respective phases and a rotation speed of the rotor 112r immediately before the electric motor 112 stops, and so on.

Means or functions or both provided by the motor controller 115 may be provided by software stored in a tangible storage device and a computer running the software, software alone, hardware alone, or a combination of the foregoing. For example, when the motor controller 115 is provided by an electronic circuit which is hardware, the motor controller 115 may be provided by a digital circuit including a large number of logic circuits or an analog circuit.

The present disclosure is not limited to specific examples described above. The specific examples with a design change added by anyone skilled in the art as needed are within the scope of the present disclosure as long as characteristics of the present disclosure are maintained. The elements provided to the respective specific examples, locations, conditions, and shapes of the respective elements, and so on are not limited to what have been specified above by way of examples and may be changed as needed. Combinations of the elements provided to the respective specific examples above may be changed as needed unless a contradiction occurs.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An electric compressor comprising:
   a compression portion configured to compress a low-pressure drawn refrigerant and discharge a high pressure refrigerant;
   an electric motor configured to drive the compression portion in accordance with rotation of a rotor;
   a motor drive circuit configured to drive the electric motor;

an intermediate pressure port through which an intermediate pressure refrigerant is introduced into the compression portion; and a controller configured to control the rotation of the rotor, wherein when the controller stops the electric motor during a two-step compression mode in which the intermediate pressure refrigerant is introduced into the compression portion, the controller stops the rotation of the rotor by performing a short-circuit braking of the electric motor and then fixes a rotational position of the rotor at a predetermined rotational position by performing direct current excitation of the electric motor, and when the controller determines during the direct current excitation of the electric motor that a pressure of the intermediate pressure refrigerant has decreased to a pressure level incapable of causing backward rotation of the rotor, the controller terminates the direct current excitation of the electric motor.

2. The electric compressor according to claim 1, wherein when the controller reactivates the electric motor after the direct current excitation of the electric motor, the controller activates the electric motor based on the predetermined rotational position of the rotor.

3. The electric compressor according to claim 1, wherein when a temperature of the motor drive circuit has risen to or above a temperature threshold of the direct current excitation during the direct current excitation of the electric motor, the controller terminates the direct current excitation of the electric motor.

4. The electric compressor according to claim 3, wherein when the controller activates the electric motor after termination of the direct current excitation of the electric motor and before decrease of the pressure of the intermediate pressure refrigerant to the pressure level incapable of causing backward rotation of the rotor, the controller performs the short-circuit braking of the electric motor, then performs direct current excitation of the electric motor, and then reactivates the electric motor based on the predetermined rotational position of the rotor.

5. The electric compressor according to claim 1, wherein when a temperature of the motor drive circuit rises to or above a temperature threshold of the short-circuit braking during the short-circuit braking of the electric motor, the controller terminates the short-circuit braking of the electric motor.

6. The electric compressor according to claim 5, wherein when the controller activates the electric motor after termination of the short-circuit braking of the electric motor before decrease of the pressure of the intermediate pressure refrigerant decreases to the pressure level incapable of causing backward rotation of the rotor, the controller performs the short-circuit braking of the electric motor, then performs direct current excitation of the electric motor, and then reactivates the electric motor based on the predetermined rotational position of the rotor.

7. The electric compressor according to claim 1, wherein when a difference between the pressure of the intermediate pressure refrigerant and a pressure of the drawn refrigerant decreases to or below a predetermined pressure threshold, the controller determines that the pressure of the intermediate pressure refrigerant has decreased to the pressure level incapable of causing backward rotation of the rotor.

8. The electric compressor according to claim 1, wherein when a predetermined time has elapsed from a time of starting the direct current excitation, the controller determines that the pressure of the intermediate pressure refrigerant has decreased to the pressure level incapable of causing backward rotation of the rotor.

9. An electric compressor comprising:

a compression portion configured to compress a low-pressure drawn refrigerant and discharge a high pressure refrigerant;

an electric motor configured to drive the compression portion in accordance with rotation of a rotor;

a motor drive circuit configured to drive the electric motor;

an intermediate pressure port through which an intermediate pressure refrigerant is introduced into the compression portion; and a controller configured to control the rotation of the rotor, wherein when the controller stops the electric motor during a two-step compression mode in which the intermediate pressure refrigerant is introduced into the compression portion, the controller stops the rotation of the rotor by performing a short-circuit braking of the electric motor and then fixes a rotational position of the rotor at a predetermined rotational position by performing direct current excitation of the electric motor, when a temperature of the motor drive circuit has risen to or above a temperature threshold of the direct current excitation during the direct current excitation of the electric motor, the controller terminates the direct current excitation of the electric motor, and when the controller activates the electric motor after termination of the direct current excitation of the electric motor and before decrease of a pressure of the intermediate pressure refrigerant to a pressure level incapable of causing backward rotation of the rotor, the controller performs the short-circuit braking of the electric motor, then performs direct current excitation of the electric motor, and then reactivates the electric motor based on the predetermined rotational position of the rotor.

10. An electric compressor comprising:

a compression portion configured to compress a low-pressure drawn refrigerant and discharge a high pressure refrigerant;

an electric motor configured to drive the compression portion in accordance with rotation of a rotor;

a motor drive circuit configured to drive the electric motor;

an intermediate pressure port through which an intermediate pressure refrigerant is introduced into the compression portion; and a controller configured to control the rotation of the rotor, wherein when the controller stops the electric motor during a two-step compression mode in which the intermediate pressure refrigerant is introduced into the compression portion, the controller stops the rotation of the rotor by performing a short-circuit braking of the electric motor and then fixes a rotational position of the rotor at a predetermined rotational position by performing direct current excitation of the electric motor, when a temperature of the motor drive circuit rises to or above a temperature threshold of the short-circuit braking during the short-circuit braking of the electric motor, the controller terminates the short-circuit braking of the electric motor, and when the controller activates the electric motor after termination of the short-circuit braking of the electric motor before decrease of a pressure of the intermediate pressure refrigerant decreases to a pressure level incapable of causing backward rotation of the rotor, the controller performs the short-circuit braking of the electric motor, then performs direct current excitation of the electric motor, and then reactivates the electric motor based on the predetermined rotational position of the rotor.

* * * * *